US011488042B1

(12) United States Patent
Chapman

(10) Patent No.: US 11,488,042 B1
(45) Date of Patent: Nov. 1, 2022

(54) DYNAMIC DETERMINATION OF MEDIA CONSUMPTION

(71) Applicant: IMDB.com, Inc., Seattle, WA (US)

(72) Inventor: Murray Leigh Chapman, Seattle, WA (US)

(73) Assignee: IMDB.COM, INC., Seattle, WA (US)

( * ) Notice: Subject to any disclaimer, the term of this patent is extended or adjusted under 35 U.S.C. 154(b) by 1302 days.

(21) Appl. No.: 14/632,175

(22) Filed: Feb. 26, 2015

(51) Int. Cl.
*G06N 5/04* (2006.01)
*G06N 7/00* (2006.01)
*H04L 67/10* (2022.01)

(52) U.S. Cl.
CPC .............. *G06N 5/047* (2013.01); *G06N 7/005* (2013.01); *H04L 67/10* (2013.01)

(58) Field of Classification Search
CPC ......... G06N 5/047; G06N 7/005; G04L 67/10
See application file for complete search history.

(56) References Cited

U.S. PATENT DOCUMENTS

| 8,806,320 | B1* | 8/2014 | Abdo ................ | G06F 17/30017 715/203 |
| 2012/0159337 | A1* | 6/2012 | Travilla ............. | G06Q 30/0631 715/738 |
| 2013/0085804 | A1* | 4/2013 | Left .................... | G06Q 30/0219 705/7.29 |
| 2015/0293928 | A1* | 10/2015 | Chen ................. | G06F 17/30029 707/738 |
| 2016/0142783 | A1* | 5/2016 | Bagga .............. | H04N 21/47214 725/47 |

* cited by examiner

*Primary Examiner* — Kevin W Figueroa
(74) *Attorney, Agent, or Firm* — Thomas | Horstemeyer, LLP

(57) ABSTRACT

Disclosed are various embodiments for dynamically determining media consumption of a user. A user may perform at least one of a plurality of consumption indication events for a media item. The consumption indication events may include submitting a rating of the media item, submitting a review of the media item, indicating a present consumption of the media item, indicating a past consumption of the media item, etc. It may be determined that the user has consumed the media item in response to determining that the user has performed at least one of the consumption indication events for the media item.

20 Claims, 12 Drawing Sheets

DYNAMIC DETERMINATION OF MEDIA CONSUMPTION

BACKGROUND

Certain media items, such as movies, may be consumed at various outlets, such as at a movie theater. People who watch these movies may subsequently submit a rating and/or review of the movie. Similarly, people may check-in to a location where they are watching a movie via their social networking account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to aggregating media consumption of a user from various sources to enhance user experiences in navigating a media database. As a non-limiting example, information about the media consumption of a user may be based on media items that have actively been purchased and/or streamed by the user over the Internet. However, a user may also consume media in various other ways. For example, the user may have watched a movie at a movie theater or listened to an album at a friend's house. In this regard, the user may indicate consumption of the media by performing various actions on sites accessible over a network. For example, the user may select a rating of the media item, the user may submit a review of the media item, the user may indicate a present consumption of the media item, or the user may indicate a past consumption of the media item. The consumption history of the user may be updated to reflect that the user has performed one of these actions indicating that the user has consumed the media item.

Various embodiments of the disclosure present content that is related to information about the consumption history of the user. Media consumption patterns may be determined based on the media item in the consumption history of the user. The user may be presented with media item that the user may have already consumed based on the media consumption patterns. The user may indicate whether the user has previously consumed the media item or not. The user may also be presented with recommendations for media items based on the media consumption patterns and the consumption history.

Figure 1:
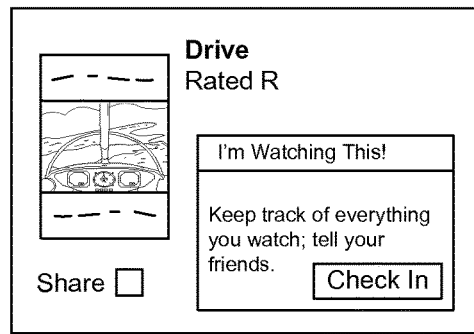
FIG. 1 is a pictorial diagram of portions of example user interfaces rendered by a client device according to various embodiments of the present disclosure.
Figure 1:
Figure 1:
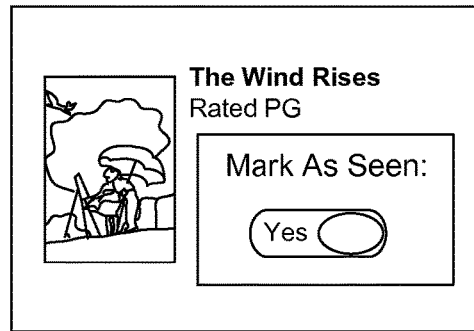
Figure 1:
Figure 1:
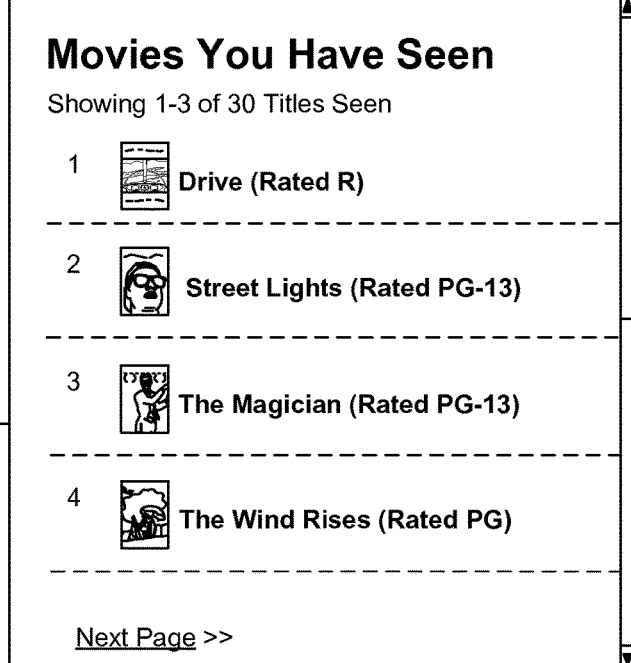

With reference to FIG. 1, shown is a pictorial diagram of portions of example user interfaces that may be rendered by a client according to various embodiments. As discussed above, users may perform various actions on network pages that may provide information as to whether a user has consumed a media item. In the non-limiting example of FIG. 1, shown are example user interfaces that may be rendered by a client device in response to a user performing a consumption indication event for a media item. In particular, FIG. 1 shows a rating interface 103, a review interface 106, a check-in interface 109, a solicitation interface 112, and a consumption history interface 115.

According to various embodiments, the rating interface 103 may comprise information related to a media item whereby the user may select and/or manually enter a rating for the media item. In the non-limiting example of FIG. 1, the user may have selected a rating of three out of five stars for the media item entitled "Street Lights." In this way, the user has indirectly indicated consumption of the media item by rating the media item. Based on the user rating, a consumption aggregator may record that the user has consumed the media item entitled "Street Lights" in a consumption history of the user.

According to various embodiments, the review interface 106 may comprise information related to a media item and a component configured to receive content that expresses positive or negative preferences or feedback from a user regarding the media item. In the non-limiting example of FIG. 1, the user may have manually entered a textual review of the media item entitled "The Magician." The textual review may be presented in the review interface 106 with a corresponding rating. In this way, the user has indirectly indicated consumption of the media item by submitting a review of the media item. Based on the user review, the consumption aggregator may record that the user has consumed the media item entitled "The Magician" in the consumption history of the user.

According to various embodiments, the check-in interface 109 may comprise information related to a media item and a component configured to receive an indication from the user that the user is presently consuming the media item. In the non-limiting example of FIG. 1, the user may select the "Check-In" component to generate a check-in event associated with the media item. The check-in event may indicate that the user is presently consuming the media item entitled "Drive." In this way, the user has indirectly indicated consumption of the media item by generating a check-in event associated with the media item. Based on the user check-in event, the consumption aggregator may record that the user has consumed the media item entitled "Drive" in the consumption history of the user.

According to various embodiments, the solicitation interface 112 may comprise information related to a media item and a component configured to receive an indication from the user that the user has previously consumed the media item. In the non-limiting example of FIG. 1, the user may select the component to mark the media item entitled "The Wind Rises" as previously consumed. In this way, the user has explicitly indicated consumption of the media item. Based on the user indication of past consumption, the consumption aggregator may record that the user has consumed the media item entitled "The Wind Rises" in the consumption history of the user.

In one embodiment, the consumption history interface 115 may present to the user a list of media items that the user has indicated as consumed from the rating interface 103, the review interface 106, the check-in interface 109, and the solicitation interface 112. In the non-limiting example of FIG. 1, the user may be presented with a list of movies that the user has seen including the media items from the interfaces through which the user has indicated consumption of the media item.

Figure 2:
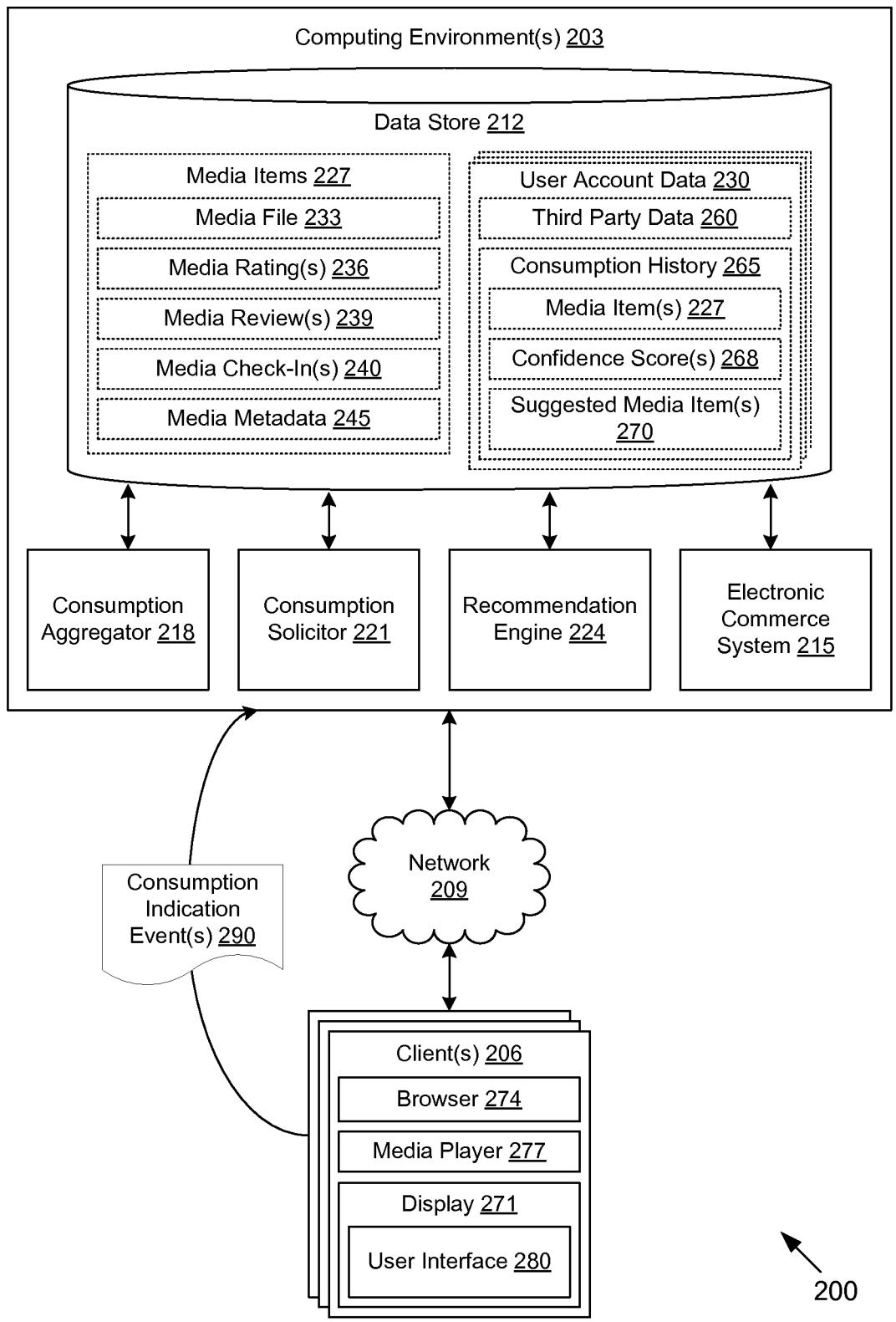
FIG. 2 is a drawing of a networked environment according to various embodiments of the present disclosure.

With reference to FIG. 2, shown is a networked environment 200 according to various embodiments. The networked environment 200 includes a computing environment 203 in data communication with one or more clients 206 by way of a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks, or computer banks, or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional users described below.

The components executed on the computing environment 203, for example, include an electronic commerce system 215, a consumption aggregator 218, a consumption solicitor 221, a recommendation engine 224, and other applications, services, processes, systems, engines, or functionality not discussed in detail herein. The electronic commerce system 215 is executed in order to facilitate the online purchase of media items and other items over the network 209. The electronic commerce system 215 also performs various backend functions associated with the online presence of an organization to facilitate the online purchase of the items. For example, the electronic commerce system 215 may generate network pages or portions thereof that are provided to clients 206 for the purposes of selecting media items and/or other items for purchase, rental, download, lease, or other forms of consumption.

According to some embodiments, the consumption aggregator 218 is executed to obtain indications that a user has consumed a media item based on whether the user has performed at least one of a plurality of consumption indication events with regard to the media item. In this way, the consumption aggregator 218 may interface with one or more network pages, such as web pages or mobile applications, to facilitate obtaining indications that the user has consumed a media item. In one embodiment, the consumption aggregator 218 may determine that a user has submitted a rating of a media item on a rating interface 103 (FIG. 1), submitted a review of the media item on a review interface 106 (FIG. 1), checked-in the media item on a check-in interface 109 (FIG. 1), indicated the media item as previously consumed on a solicitation interface 112 (FIG. 1), and/or performed any other action that may inherently indicate that the user has consumed the media item. Thus, the consumption aggregator may determine that the user has consumed the media item presented on the rating interface 103 and record the consumption of the media item in the consumption history of the user.

According to various embodiments, the consumption solicitor 221 is executed to process consumption data in the consumption history of the user and possibly other data to identify patterns of consumption in the consumption history of the user. In one embodiment, the consumption solicitor 221 may first be executed to identify a pattern in the consumption history. The consumption solicitor 221 may then determine that a user may have consumed a suggested media item based on the pattern. In this way, the consumption solicitor 221 may also compute a confidence score associated with a likelihood that the user consumed the suggested media item. The consumption solicitor 221 may prompt the user to indicate whether the user has consumed the suggested media item based on the confidence score.

In some embodiments, the recommendation engine 224 is executed to process consumption data in the consumption history of the user and possibly other data to identify patterns of consumption in the consumption history of the user. In one embodiment, the recommendation engine 224 may generate recommendations of other media items in which the user may be interested. In one embodiment, the recommendation engine 224 may exclude media items in the consumption history of the user when presenting the user with recommendations of the other media items.

The data stored in the data store 212 includes, for example, media items 227, user account data 230, and potentially other data. The media items 227 may include various information about the media associated with each media item 227. Each media item 227 may also include the media file 233, media ratings 236, media reviews 239, media check-ins 240, media metadata 245, and potentially other data. A media file 233 may include a digital media file representing the media entry in one or more of various media formats. For example, the media file 233 associated with a media item 227 can include, but is not limited to, an MPEG-1 Audio Layer III (MP3) file representing an audio track, an MPEG 4 audio file, flash video (fly file), or any audio, video, or image format in which media can be stored and/or streamed to a client 206.

The media ratings 236 may include one or more user submitted ratings of a media item 227. In one embodiment, each of the users may have submitted a rating of the media item on a scale of one to five. The media ratings 236 may include the rating in association with the user that submitted the rating. The media ratings may also include an overall rating of the media item, which may be computed by calculating an average of the ratings submitted by the users. In some cases, the media ratings 236 may be generated in third-party systems, such as, for example, in a social network. In those cases, the media ratings 236 may be imported from the third-party system and stored in the data store 212.

The media reviews 239 may include one or more user submitted reviews of a media item 227. The media review 239 may indicate positive or negative feedback regarding the media item 227 from the user who submitted the media review 239. In some embodiments, the media reviews 239 may include a textual entry describing a user sentiment of the media item 227. The textual entry may include a plurality of terms indicating an opinion of the media item 227, an approval or disapproval of the media item 227, a complex analysis of the media item 227, etc. In some cases, the media reviews 239 may be generated in third-party environments, such as, for example, in a social network computing environment. In those cases, the media reviews 239 may be imported from the third-party system and stored in the data store 212.

The media check-ins 240 may include one or more check-ins from a user indicating that the user has consumed the associated media item 227. In some cases, the media check-ins 240 may be generated in a third-party system, such as, for example, a social network. In those cases, the media check-ins 240 may be imported from the third-party system and stored in the data store 212.

Each media item 227 can also be associated with media metadata 245, which can include performer information, a title, an author, a writer, a producer, a category, a genre, or any other data by which the media item 227 can be categorized.

The data store 212 may also include user account data 230, which may be associated with third-party data 260, consumption history 265, and potentially other data. The user account data 230 may be associated with a user. For example, a user may include a family of four individual users, a small entity of twenty individual users, etc. The user may also be associated with the client 206. In this regard, the client 206 may be registered as a device associated with the user account data 230. The user account data 230 may further include, for example, user credentials, a purchase history, a browse history, a wish list, etc.

The user account data 230 may be associated with third-party data 260, which may be associated with third-party environments, such as, for example, a social networking environment with which the user is also associated. Third-party environments may include various platforms by which users can interact and discuss media items 227. In this regard, third-party data 260 may include information regarding the interactions and discussion of media items 227 performed by a user on the third-party environments. In some embodiments, information that may be used to determine whether a user has consumed a media item may be imported from such third-party environments and stored in the third-party data 260.

The user account data 230 may also be associated with a consumption history 265 of the user. The consumption history 265 may include a log or record of media items 227 consumed by the user. In particular, the consumption history 265 may include media items 227 that the user has actively streamed and/or purchased via the electronic commerce system 215, for example. Alternatively, the consumption history 265 may include media items 227 that the user streamed and/or purchased via a third-party environment. In addition, the consumption history 265 may also include media items 227 that the consumption aggregator 218 has determined to have been consumed by the user. Each of the media items 227 in the consumption history 265 may also be associated with a time of consumption (including start and/or end times), a location of the client 206 during the consumption, a type of client 206 used for the consumption, and/or other data. The consumption history 265 may be based upon consumption indication events 290 as will be described herein.

In some embodiments, the consumption history 265 may also include a plurality of suggested media items 270. A suggested media item 270 may be associated with a media item 227 that the user may likely have seen. In one embodiment, the suggested media items 270 may be identified based on a consumption pattern identified in the consumption history 265. Each of the suggested media items 270 in the consumption history 265 may also be associated with a confidence score 268, indicating a likelihood that the user has consumed the suggested media item 270.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 271. The display 271 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 206 may be configured to execute various applications such as a browser 274, a media player 277, and/or other applications. The browser 274 may be executed in a client 206, for example, to access network content served up by the computing environment 203 and/or other servers, thereby rendering a user interface 280 on the display 271. To this end, the browser 274 may comprise, for example, a browser, a dedicated application, etc., and the user interface 280 may comprise a network page, an application screen, etc. In particular, the user interface 280 may be embodied as the rating interface 103, the review interface 106, the check-in interface 109, the solicitation interface 112, the consumption history interface 115, and potentially any other interface related to media consumption. The client 206 may be configured to execute applications beyond the browser 274 and the media player 277 such as, for example, email applications, social networking applications, word processors, spreadsheets, and/or other applications.

Next, a general description of the operation of the various components of the networked environment 200 is provided. To begin, a user may indicate consumption of a media item 227 by performing at least one consumption indication event 290 for the media item 227. The consumption indication events 290 may include, for example, the user submitting a media rating 236 for the media item 227, the user submitting a media review 239 for the media item 227, the user submitting a media check-in indicating a present consumption of the media item 227, or the user indicating a previous consumption of media item 227. The consumption aggregator 218 may determine that the user has performed at least one of the consumption indication events 290. The media item 227 can be recorded in the consumption history 265 associated with the user.

In some embodiments, the consumption solicitor 221 may identify a consumption pattern in the consumption history 265 associated with the user. For example, the consumption pattern may indicate that the user has consumed a second, third, and fourth seasons of a television program. The consumption solicitor 221 may determine that it is likely that the user also consumed the first season of the television program. The consumption solicitor 221 may then determine a confidence score indicating a likelihood that the user has already viewed the first season of the television program. Based on the confidence score, the consumption solicitor 221 may encode for display a user interface 280 for display on the client 206. The user interface 280 may include a selectable component soliciting the user as to whether the user has previously viewed season one of the television program. The user may select the component to indicate that the user has previously viewed season one of the television program. In this regard, the consumption solicitor 221 may identify consumption history patterns and suggest media items 227 based on the consumption history pattern.

According to some embodiments, the recommendation engine 224 may also identify consumption history patterns to recommend media items 227 that the user may be interested in consuming. For example, the recommendation engine 224 may identify that the user has already consumed several media items 227 in which the media metadata 245 indicates a similar first listed actor. In such a case, the consumption aggregator 218 may determine that the user has not performed any consumption indication event 290 associated with another media item 227 with the same first listed actor. Similarly, the consumption solicitor 221 may determine that the confidence score 268 associated with the other media item 227 with the same first listed actor may be less than a threshold level. In such a case, the recommendation engine may recommend the other media item 227 with the same first listed actor to the user for present consumption. Such a recommendation may therefore based upon the consumption habits of the user and the various activities the user performs with regard to media items 227.

Figure 3:
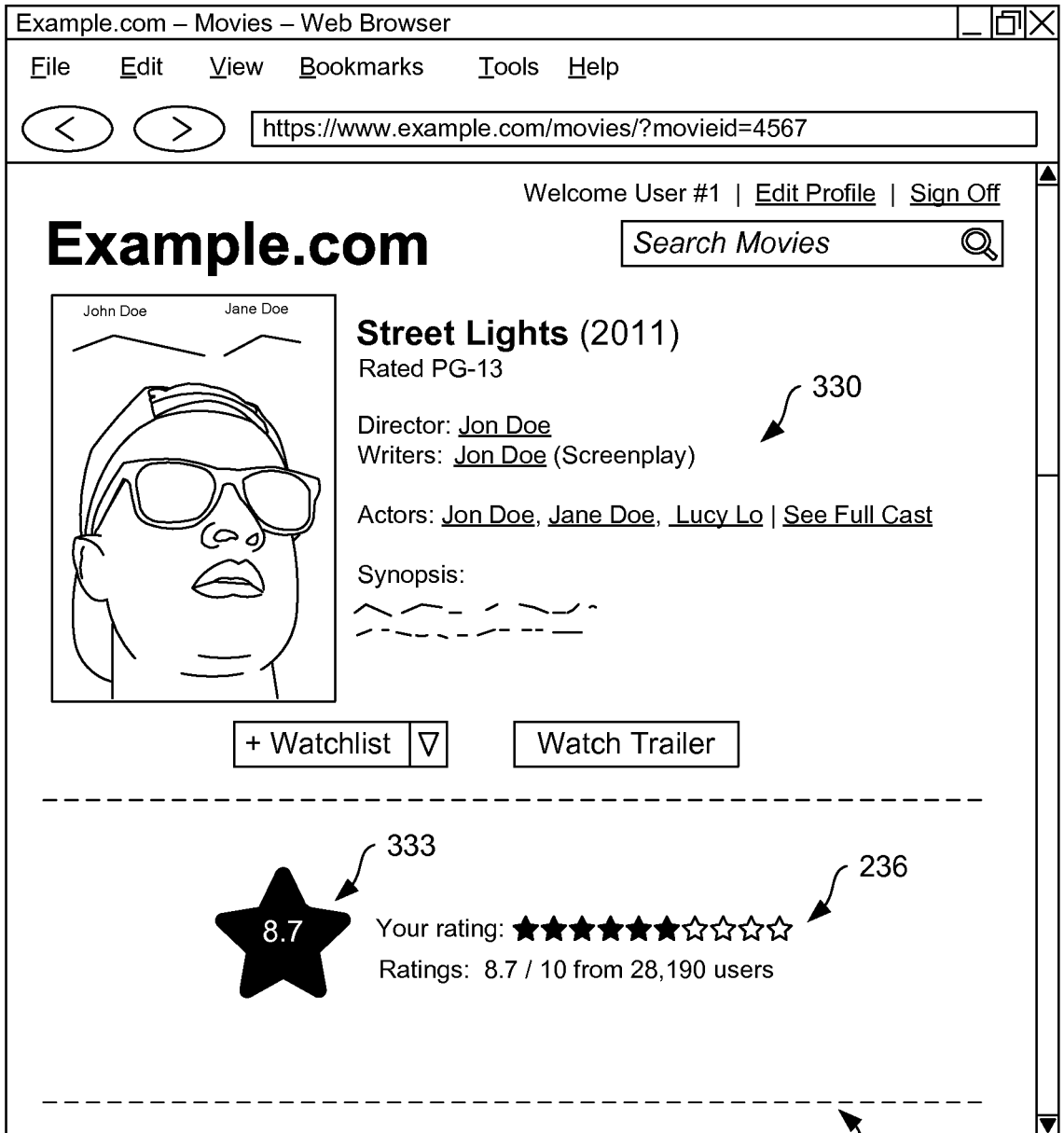
FIGS. 3-8 are pictorial diagrams of example user interfaces rendered by a client in the networked environment of FIG. 2 according to various embodiments of the present disclosure.

Referring next to FIG. 3, shown is a pictorial diagram of an example user interface 280*a* rendered by the client 206 (FIG. 2) in the networked environment 200 of FIG. 2 according to various embodiments of the present disclosure. In the non-limiting example of FIG. 3, the user interface 280*a* may comprise an item description page, providing users with information about the media item 227 (FIG. 2), such as media data 330. For example, as shown in FIG. 3, the media data 330 may include information about the media item 227 being displayed such as, for example, the synopsis, cast, crew, filming location, etc. The user interface 280*a* shown in FIG. 3 may also include the rating interface 103.

The rating interface 103 may, for example, include selectable components through which the user can select a graphical representation of a rating of the media item 227. In the example shown in FIG. 3, the user may select six out of the ten stars present on the rating interface 103 as the media rating 236 provided by the user. In such a case, the media rating 236 for the media item 227 entitled "Street Lights" may be stored as a numerical value of six. Alternatively, a user may manually enter a numerical value for the media rating 236. The rating interface 103 may also present the overall rating 333 of the media item 227. The overall rating 333 may be computed by calculating an average of the media ratings 236 submitted by individual users. The consumption aggregator 218 (FIG. 2) may determine that a user has viewed the film "Street Lights" based on the media rating 236 submitted by the user. The consumption aggregator 218 may then record consumption of the media item 227 associated with the film "Street Lights" in the consumption history 265 (FIG. 2) of the user.

Figure 4:
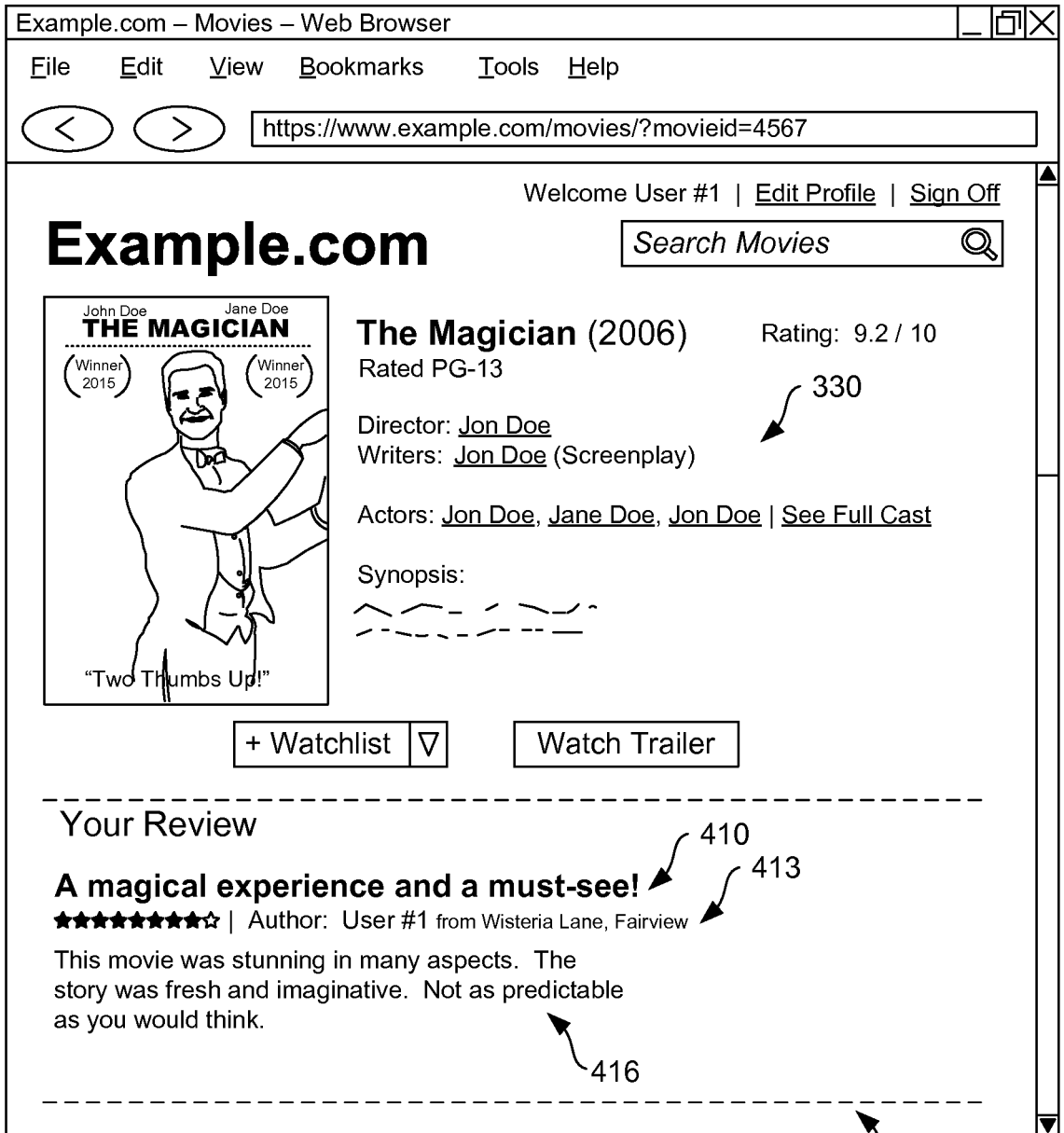

Turning now to FIG. 4, shown is a pictorial diagram of an example user interface 280*b* rendered by the client 206 (FIG. 2) in the networked environment 200 of FIG. 2 according to various embodiments of the present disclosure. In the non-limiting example of FIG. 4, the user interface 280*b* may include an item description page, providing users with information about the media item 227 (FIG. 2), such as media data 330. The user interface 280*b* shown in FIG. 4 may also include the review interface 106.

The review interface 106 may, for example, include components configured to receive a media review 239 (FIG. 2) of the media item 227. The media review 239 may include a title 410, a location 413, a description 416, and potentially other components. The title 410 may include a short textual description of an opinion toward the media item 227. In one embodiment, the title 410 may be no more than 600 characters. The description 416 may include a textual description of a sentiment and/or an approval or disapproval of the media item 227. In this regard, the description 416 may include textual words that provide a complex analysis of the media item 227. The review interface 106 may include components whereby a user can manually enter the title 410 and description 416. The location 413 may be determined automatically and recorded with the media review 239. The consumption aggregator 218 (FIG. 2) may determine that a user has viewed the film "The Magician" based on the media review 239 submitted by the user. The consumption aggregator 218 may then record consumption of the media item 227 associated with the film "The Magician" in the consumption history 265 (FIG. 2) of the user.

Figure 5:
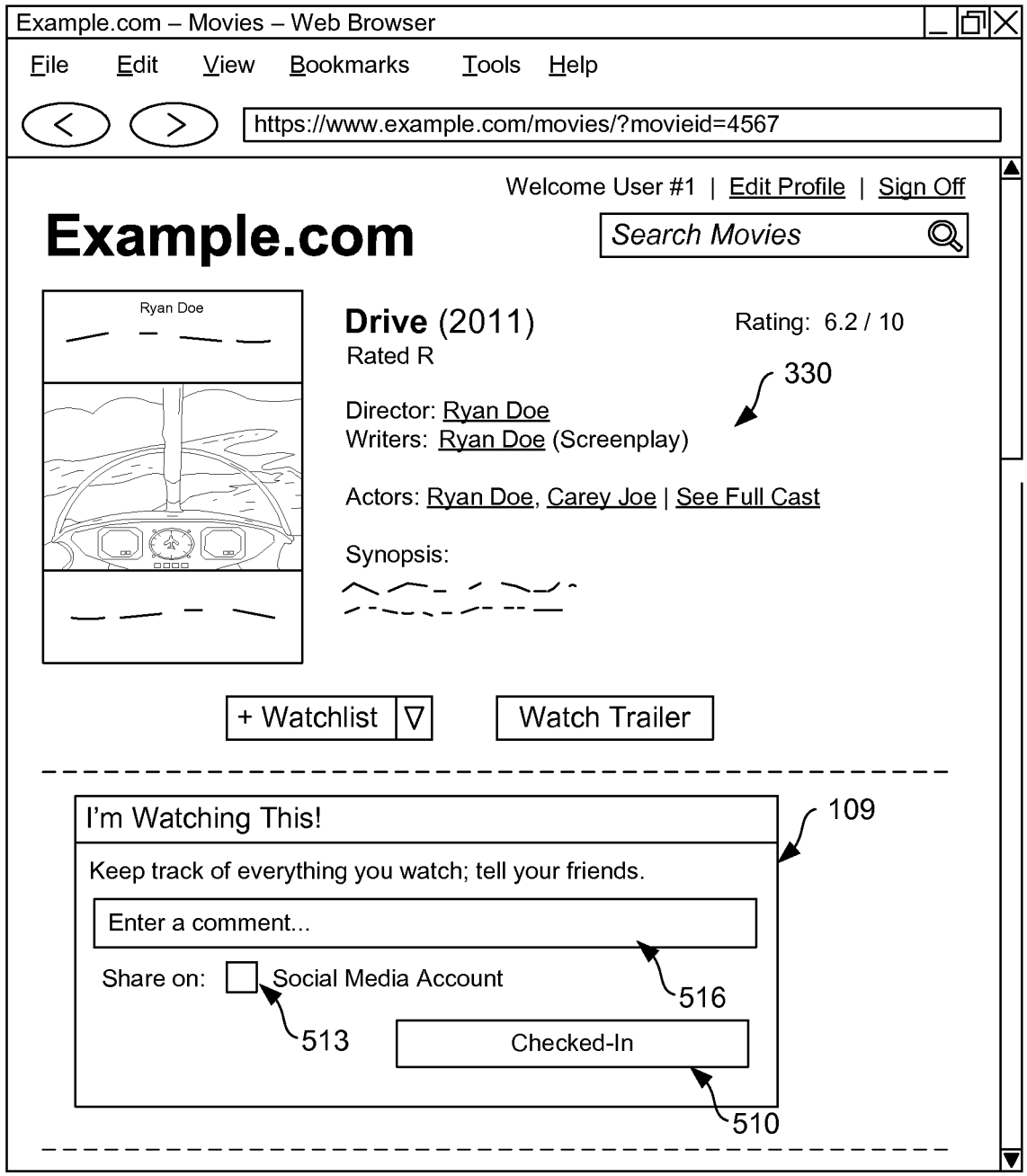

Moving on to FIG. 5, shown is a pictorial diagram of an example user interface 280*c* rendered by the client 206 (FIG. 2) in the networked environment 200 of FIG. 2 according to various embodiments of the present disclosure. In the non-limiting example of FIG. 5, the user interface 280*c* may comprise an item description page, providing users with information about the media item 227 (FIG. 2), such as media data 330. The user interface 280*c* shown in FIG. 5 may also include the check-in interface 109.

The check-in interface 109 may, for example, include a selectable component prompting a user to select the component when the user is presently consuming or about to consume a media item 227. In particular, once the user selects the component via the check-in interface 109, the user may have generated a media check-in 240 (FIG. 2) for that media item 227. In the non-limiting example shown in FIG. 5, the user may have already selected the component 510 labelled "Check-In" to indicate that the user is presently viewing the film entitled "Drive." In this regard, once the user has selected the component 510 to generate a media check-in 240, the media check-in 240 may be stored in association with the media item 227 in the data store 212.

Once the user has generated a media check-in 240 for the film, the check-in interface 109 may prompt the user, via component 513, to share the check-in event with other users. For example, the user may check-in to see a movie at a specific movie theater on a network page associated with a media informational environment. The network page may display information related to the media items 227. The network page may comprise the check-in interface 109 such that the user may check-in to viewing the movie and share the check-in, via component 513, with other users of the media informational environment. In addition, the user may select component 513 to share the check-in event with other users on a third party environment associated with the user.

In one embodiment, the user may also enter a textual comment, similar to media review 239, into the comment section 516. The comment and the check-in event may be shared via a social media account associated with the user. In this regard, the consumption aggregator 218 may determine that a user has viewed the film "Drive" based on the media check-in 240 submitted by the user. The consumption aggregator 218 (FIG. 2) may then record consumption of the media item 227 associated with the film "Street Lights" in the consumption history 265 (FIG. 2) of the user.

Figure 6:
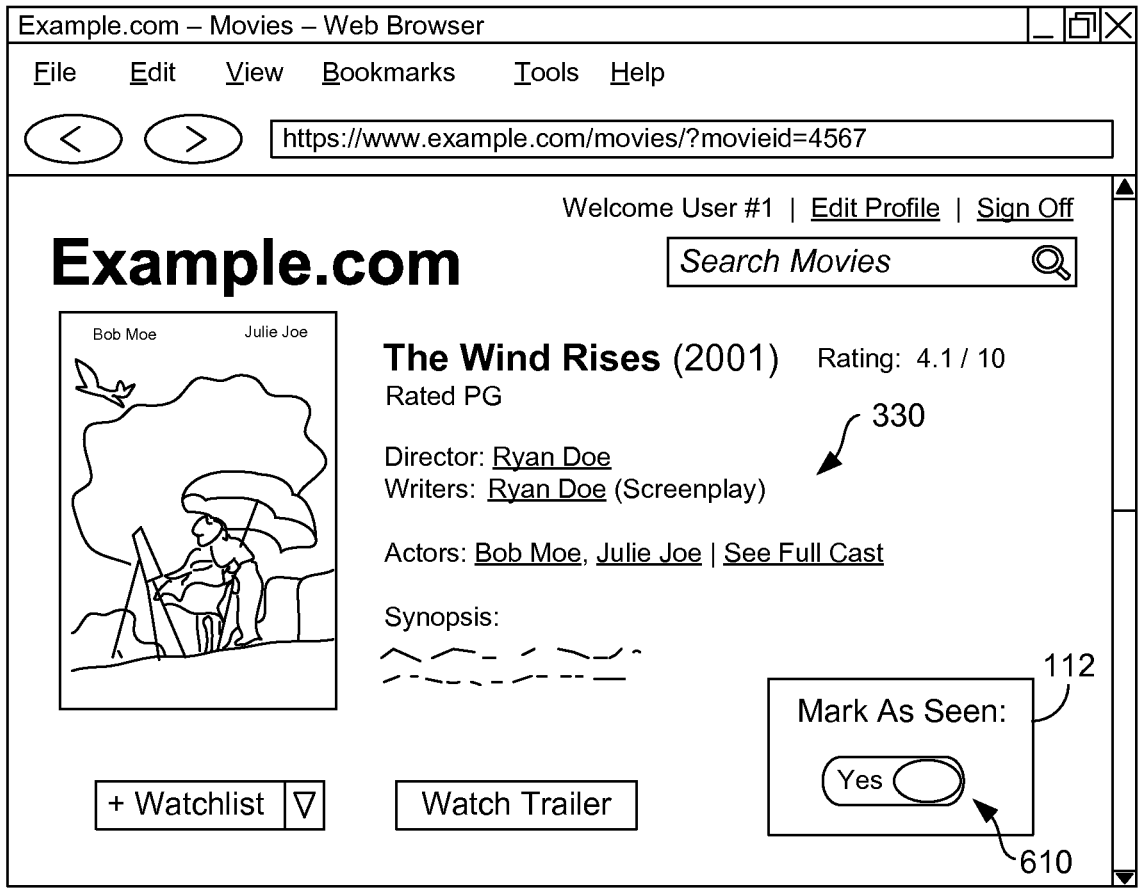

Turning now to FIG. 6, shown is a pictorial diagram of an example user interface 280d rendered by the client 206 (FIG. 2) in the networked environment 200 of FIG. 2 according to various embodiments of the present disclosure. In the non-limiting example of FIG. 6, the user interface 280d may comprise an item description page, providing users with information about the media item 227 (FIG. 2), such as media data 330. The user interface 280d shown in FIG. 6 may also include the solicitation interface 112.

The solicitation interface 112 may, for example, include a component 610 whereby a user may select the component 610 to mark the media item 227 as previously consumed. In the non-limiting example shown in FIG. 6, the component 610 is embodied as a sliding button configured to receive a selection from the user that the user has previously viewed the film "The Wind Rises." The consumption aggregator 218 (FIG. 2) may determine that a user has viewed the film "The Wind Rises" based on the selection indicating that the user has seen the film. The consumption aggregator 218 may then record consumption of the media item associated with the film "The Wind Rises" in the consumption history 265 (FIG. 2) of the user.

Figure 7:
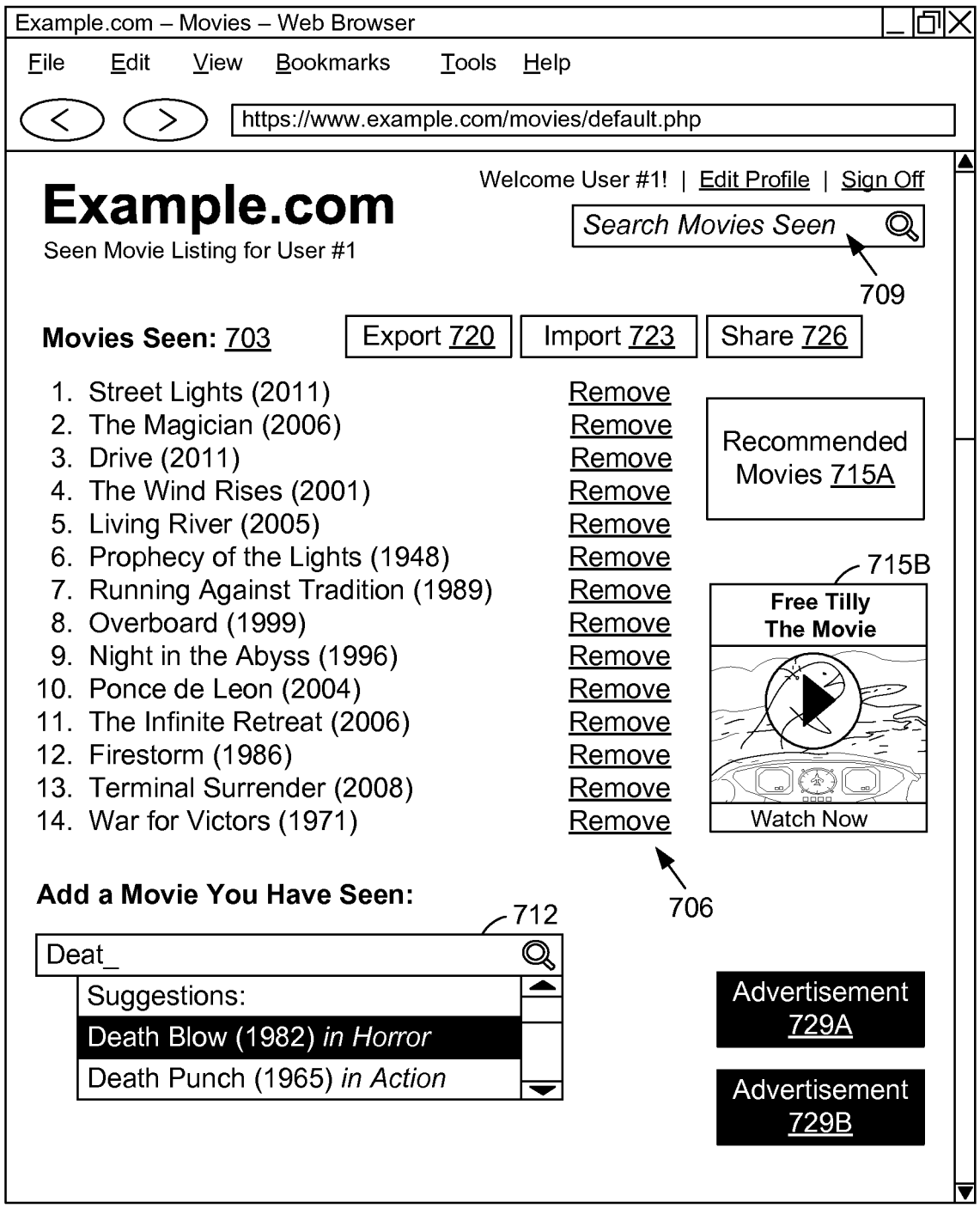

Referring next to FIG. 7, shown is a pictorial diagram of an example user interface 280e rendered by the client 206 (FIG. 2) in the networked environment 200 of FIG. 2 according to various embodiments of the present disclosure. In the non-limiting example of FIG. 7, the user interface 280e may include a listing 703 of media items 227 (FIG. 2) in the consumption history 265 (FIG. 2) of the user. In a situation where a media item 227 is incorrectly placed in the consumption history 265, the user may select to remove the media item 227 from the listing 703 via the remove component 706.

The user interface 280e further comprises textual entry components such as a search component 709, a consumed component 712, and potentially other textual entry components. The search component 709 may be configured to receive textual words indicating information related to a media item 227 that the user believes to have consumed. For example, if the user is attempting to identify a recently consumed media item 227 that was directed by a certain director, the user may enter the director's name in the search component 709. The user interface 280e may reload the listing 703 to only include the media items 227 consumed that were directed by the searched director.

The consumed component 712 may be configured to receive textual titles of media items 227 that the user has previously consumed. The consumed component 712 may provide suggestions as to which media items 227 the user is describing in a scrollable pull-down menu. The suggested media items 227 presented in the pull-down menu may include media items 227 that are spelled similarly to the textual title input into the consumed component 712. In some embodiments, the suggested media items 227 may be suggested based not only on the text input into the consumed component 712 but also based on patterns identified in the consumption history 265 of the user.

The user interface 280e may further comprise an export component 720, an import component 723, a share component 726, recommendations components 715a and 715b, advertisements 729, and potentially other components. The export component 720 may be configured to export the listing 703 to a third-party environment, such as a social network. The import component 723 may be configured import, upon selection, for example, a consumption history 265, media ratings 236 (FIG. 2), media reviews 239 (FIG. 2), media check-ins 240 (FIG. 2), and other consumption indication data from third-party services, such as a social media environment. For example, if a user has submitted a media review 239 on a social media page of a media item 227, the media review 239 may be imported from the social media page and stored under third-party data 260 (FIG. 2) of the data store 212 (FIG. 2). The consumption aggregator 218 may then determine that the user has consumed the media item 227 based on the imported media review 239 and thereby update the listing 703 of the consumption history 265 to reflect the imported data.

The share component 726 may be configured to share the listing 703 with connections of the user on a social networking environment. The recommendation component 715a may be configured to present the user with another listing of recommended media item 227 based on a pattern identified in the consumption history 265. In one embodiment, the user interface 280e may include the recommendation component 715b that displays a thumbnail image preview of a recommended media item 227. The recommendation component 715b may interface with the electronic commerce system 215 (FIG. 2) through which the user may directly purchase the recommended media item 227 to begin consumption. In addition, the user interface 280e may further comprise advertisements for products, media, and/or services via the advertisements 729a and 729b.

Figure 8:
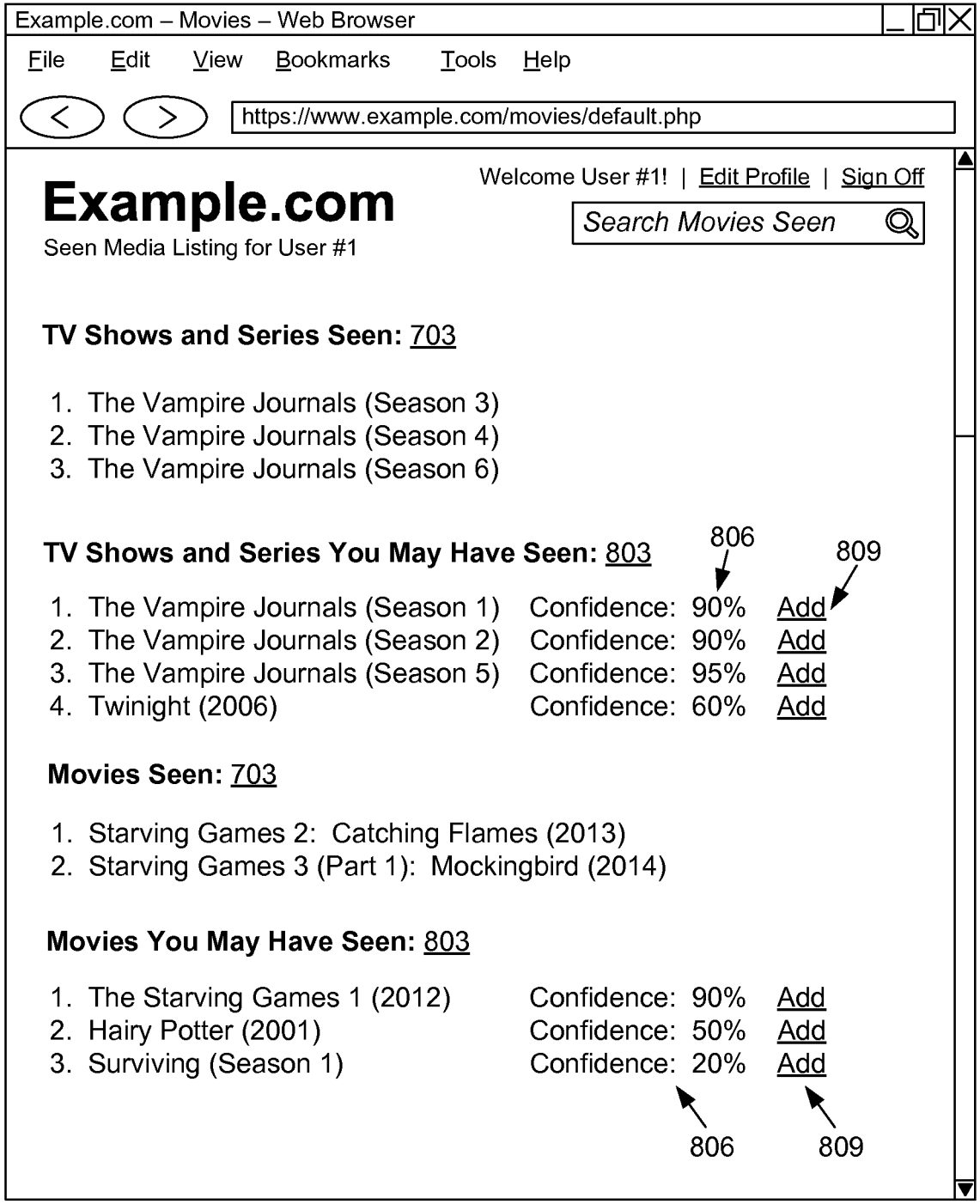

Turning to FIG. 8, shown is a pictorial diagram of an example user interface 280f rendered by the client 206 (FIG. 2) in the networked environment 200 of FIG. 2 according to various embodiments of the present disclosure. The user interface 280f may include a listing 703 of media items 227 (FIG. 2) in the consumption history 265 (FIG. 2). The user interface 280f may also include a suggested listing 803 of suggested media items 270 that a user may have consumed based on consumption patterns identified in the consumption history 265. The user interface 280f may also include a confidence level 806 for each of the suggested media items 270 in the suggested listing 803. The confidence level 806 may be associated with the confidence score 268 (FIG. 2) for each of the suggested media items 270. In this way, the confidence level 806 may represent an indication of the confidence score 268. For example, the confidence level 806 may be presented on the user interface 280f in the form of a percentage level, a numerical indication, a graphical indication, etc.

In one embodiment, the suggested media items 270 may be displayed in the suggested listing 803 only if the confidence score 268 for each of the suggested media items 227 is above a threshold, as will be further described below with reference to FIG. 10. The user interface 280f may also include an add component 809 for each of the suggested media items 270 in the suggested listing 803. Suppose the user has in fact previously consumed the suggested media item 270. In such a situation, the user can select the add component 809 to add the suggested media item 270 to the consumption history 265 of the user.

In the non-limiting example of FIG. 8, the user interface 280f may include a listing 703 of televisions shows and series previously seen and a listing 703 of movies previously seen. The user interface 280f shown in FIG. 8 may also include the suggested listing 803 of televisions shows and series the user may have seen and a listing 803 of movies the user may have seen. The user interface 280f shown in FIG. 8 may also include a suggested listing 803 of specific television episodes of a television series. The add component 809 may be configured to receive a selection from the user indicating that the user has previously seen the movie or the television show or season. The add component 809 may then add the suggested movie or television show or season to the consumption history 265 in response to receiving the selection.

Figure 9:
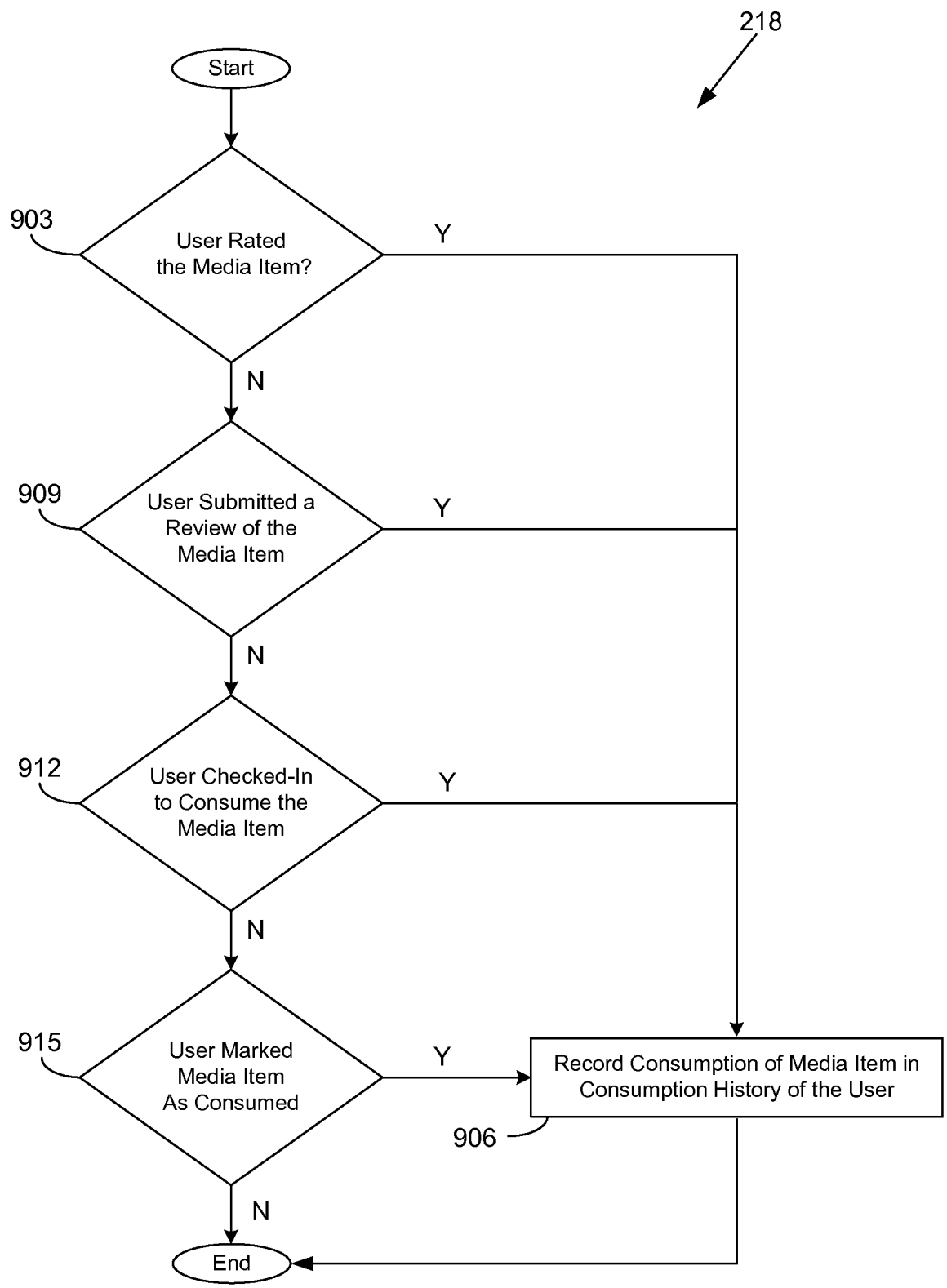
FIG. 9 is a flowchart illustrating one example of functionality implemented as portions of the consumption aggregator executed in a computing environment in the networked environment of FIG. 2 according to various embodiments of the present disclosure.

Referring next to FIG. 9, shown is a flowchart that provides one example of the operation of a portion of the consumption aggregator 218 according to various embodiments. It is understood that the flowchart of FIG. 9 provides merely an example of the many different types of functional arrangements that may be employed to implement the operation of the portion of the consumption aggregator 218 as described herein. As an alternative, the flowchart of FIG. 9 may be viewed as depicting an example of elements of a method implemented in the computing environment 203 (FIG. 2) according to one or more embodiments.

Beginning with box 903, the consumption aggregator 218 determines whether a user has submitted a media rating 236 (FIG. 2) of a media item 227 (FIG. 2). The consumption aggregator 218 may determine whether a user has submitted a media rating 236, for example, by searching for a media rating 236 submitted by the user in association with the media item 227. Alternatively, the consumption aggregator 218 may automatically log when a user submits a media review 239 for a media item 227 under user account data 230 (FIG. 2). To this end, the data store 212 (FIG. 2) may have a record of all the media ratings 236 submitted by the user. The consumption aggregator 218 may then identify whether the user has submitted a media rating 236 in association with the media item 227. If the consumption aggregator 218 determines that the user has submitted a media rating 236 of the media item 227, the consumption aggregator 218 records the consumption of the media item 227 in the consumption history 265 in box 906.

In box 909, the consumption aggregator 218 determines whether the user has submitted a media review 239 (FIG. 2) of the media item 227. For example, the consumption aggregator 218 may traverse the media reviews 239 to determine whether the user has submitted a media review 239 for the media item 227. If the consumption aggregator 218 determines that the user has submitted a media review 239 of the media item 227, the consumption aggregator 218 records the consumption of the media item 227 in the consumption history 265 in box 906.

In box 912, the consumption aggregator 218 determines whether the user has submitted a media check-in 240 (FIG. 2) for the media item 227. To this end, the consumption aggregator 218 may search the media check-ins 240 to determine whether the user has submitted a media check-in 240 for the media item 227. If the consumption aggregator 218 determines that the user has submitted a media check-in 240 of the media item 227, the consumption aggregator 218 records the consumption of the media item 227 in the consumption history 265 in box 906.

In box 915, the consumption aggregator 218 determines whether the user has indicated that the user has previously consumed the media item 227. For example, the consumption aggregator 218 may receive a selection from the user indicating that the user has previously consumed the media item 227 via at least a portion of the user interface 280 (FIG. 2), such as the solicitation interface depicted in FIG. 6. In addition, the consumption aggregator 218 may receive a textual entry of the media item 227 via the consumed component 712 (FIG. 7) of the user interface 280, for example. To this end, if the consumption aggregator 218 determines that the user has indicated a previous consumption of the media item 227, the consumption aggregator 218 records the consumption of the media item 227 in the consumption history 265 in box 906. Thereafter, the portion of the consumption aggregator 218 ends.

In some embodiments, the consumption aggregator 218 may determine whether a user has submitted a media rating 236, media review 239, media check-in 240, and/or otherwise indicated explicit consumption of a media item 227 falsely. In such a case, the consumption aggregator 218 may receive an indication that the user has falsely indicated consumption of the media item 227. In one embodiment, consumption aggregator 218 may add the user to a blocked list such that the user is restricted from submitting data regarding media items 227. Alternatively, consumption aggregator 218 may flag the user as a false entity that submits incorrect information regarding media items 227.

The consumption aggregator 210 may be configured to identify various types of inherent indications that a user has consumed a media item 227. For example, the consumption aggregator 210 may be configured to communicate with a global positioning unit on a client 206 associated with the user to determine a geolocation of a user at various times. For example, the consumption aggregator 210 may obtain a geolocation of the user while the user is at a movie theater location watching a movie. The consumption aggregator 210 may be configured to map the geolocation of the user to the exact room in the movie theater based on data stored in data store 212 to determine that the user is viewing a specific movie. In such a case, the consumption aggregator 210 may record consumption of that movie in the consumption history 265 of the user with a relatively high confidence score 268. The consumption aggregator 210 may also be configured to communicate with a microphone on the client 206 associated with the user to extract auditory signals, such as spoken words, indicating that the user has previously consumed a media item 227. It may be appreciated that the consumption aggregator 210 may be configured to receive various types of inherent indications that a user has consumed a media item.

Figure 10:
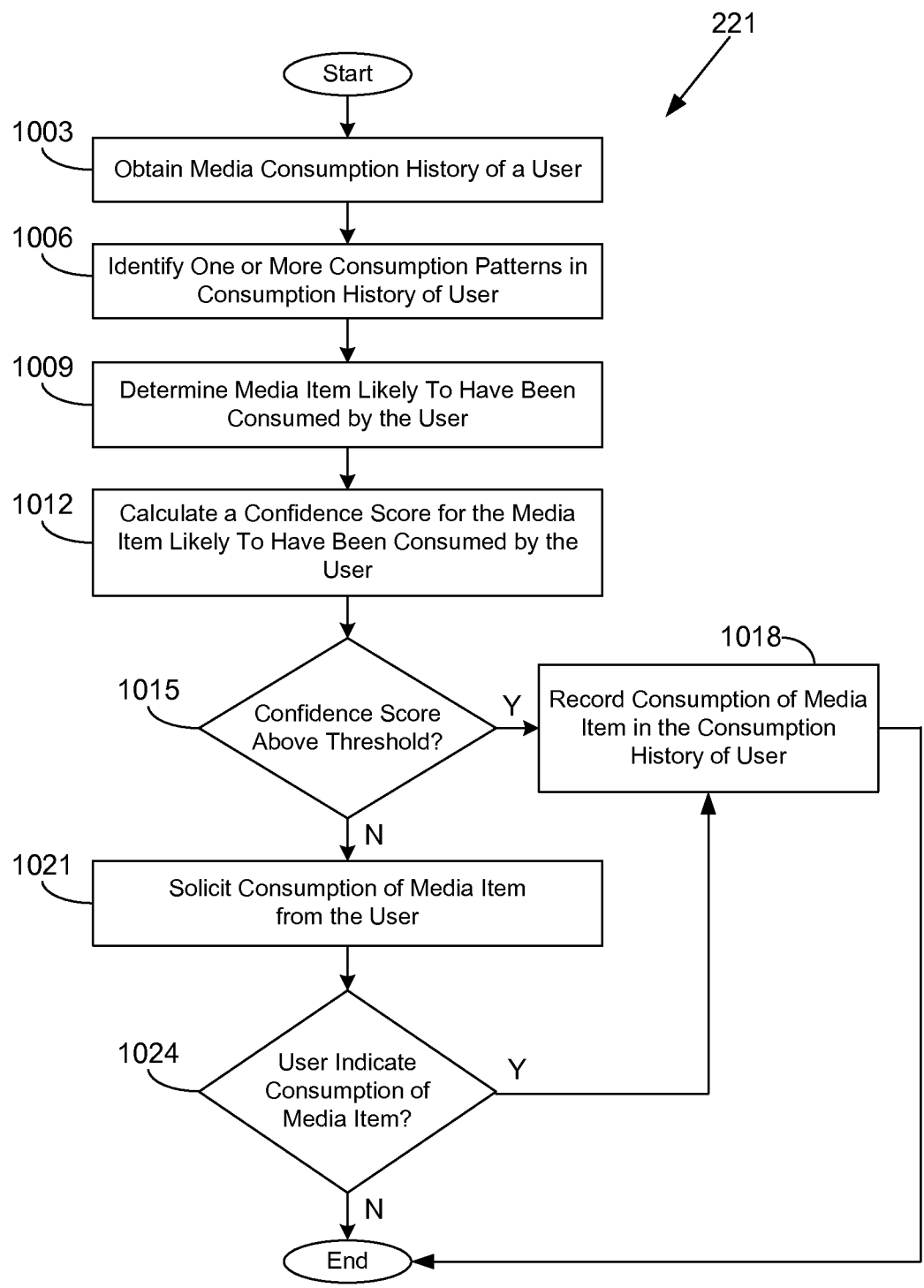
FIG. 10 is a flowchart illustrating one example of functionality implemented as portions of the consumption solicitor executed in a computing environment in the networked environment of FIG. 2 according to various embodiments of the present disclosure.

With reference to FIG. 10, shown is a flowchart that provides one example of the operation of a portion of the consumption solicitor 221 according to various embodiments. It is understood that the flowchart of FIG. 10 provides merely an example of the many different types of functional arrangements that may be employed to implement the operation of the portion of the consumption solicitor 221 as described herein. As an alternative, the flowchart of FIG. 10 may be viewed as depicting an example of elements of a method implemented in the computing environment 203 (FIG. 1) according to one or more embodiments.

Beginning in box 1003, the consumption solicitor 221 obtains the consumption history 265 (FIG. 2) of a user. In box 1006, the consumption solicitor 221 identifies one or more consumption patterns in the consumption history 265.

In this regard, the patterns of media consumption may relate to series and/or sequels of media items 227. For example, it may be the case that the user has seen the second, third, and fourth season of a television series media item 227. As another example, it may be the case that the user has seen all but one episode of season one of a television series. It may also be the case that a user has seen two movie media items 227 that are sequels of a first movie media item 227 that the user has not indicated as previously consumed. The patterns of media consumption may also relate to a user having consumed numerous media items 227 related to one person of interest. For example, it may also be the case that the user has read almost all novel media items 227 by a certain author. The patterns of media consumption may also relate to media items 227 being of the category. For example, it may be the case that the user mostly listens to music by artists categorized under a slow country music genre. In this way, the categories of the media items 227 may relate to tempo, frequency content, length, media type, artists, instruments, photographers, actors, genres, authors, directors, producers, and/or any other media attribute from the media metadata 245 (FIG. 2) that may be identified in the media consumption history 265.

From the media consumption patterns, the consumption solicitor 221 is configured to determine the suggested media items 270 (FIG. 2) that are likely to have consumed by the user in box 1009. As an illustrative example, the consumption solicitor 221 may determine that a user has seen season two and season three of a television series based on the consumption history 265. In such a scenario, the consumption solicitor 221 may identify season one of the television series as a suggested media item 270 because it is likely that the user also previously viewed season one of the television series.

As another illustrative example, it may be the case that the user has seen all of the episodes of season one of a television series except for one episode. The consumption solicitor 221 may determine that it is likely that the user has in fact seen that episode. In such a case, the consumption solicitor 221 may identify that episode of season one of the television series as a suggested media item 270.

Alternatively, there are situations where certain episodes of a television series, for example, the first episode, or pilot episode, of a television series is quite different from the rest of the episodes of the season and/or series. The user may have intended to skip such an episode while watching the remaining episodes of the season and/or series. In such a case, the consumption solicitor 221 may determine that the episode is not a candidate to be a suggested media item 270. Alternatively, the consumption solicitor 221 may determine that the episode is a suggested media item 270 while assigning the episode a relatively low confidence score 268.

As yet another illustrative example, the consumption solicitor 221 may determine that a user has searched for products, such as clothing items, that are related to a media item 227 on the electronic commerce system 215. In this regard, the consumption solicitor 221 may deem it likely that the user has consumed the media item 227 since the user is searching and/or purchasing products related to the media item 227. As such, the consumption solicitor 221 may then identify the media item 227 as a suggested media item 270. The consumption solicitor 221 may also identify suggested media items 270 based on related search queries performed on third-party environments and imported into third-party data 260 (FIG. 2).

The consumption solicitor 221 may also be configured to determine the suggested media items 270 based at least in part on information stored in the media items 227 in the consumption history 265. For example, the consumption solicitor 221 may extract pre-defined terms from the title 410 (FIG. 4) and/or description 416 (FIG. 4) of a media review 239 (FIG. 2) to determine whether another media item 227 is mentioned in the media review 239. For example, users may often compare movies in a media review 239 to establish a sentiment toward the movie. In this regard, if a user compared movies in a media review 239, it may be determined that the user has seen all of the movies mentioned in the media review 239. To this end, the consumption solicitor 221 may traverse the text in the title 410 and the description 416 and extract text identifying another media item 227. The consumption aggregator 218 may store the other identified media item 227 as a suggested media item 270.

In box 1012, the consumption solicitor 221 may calculate a confidence score 268 (FIG. 2) for each of the suggested media items 270. As described above, the confidence score 268 may represent a likelihood that the user has previously consumed the media item 227. In one embodiment, the confidence score may be determined by computing a weighted sum of scores for a plurality of consumption factors. The plurality of consumption factors may be based on activities a user performs with regard to certain media items 227 in the consumption history 265 of a user that suggests that the user may have consumed the certain media item 227. For example, the consumption factors may include a user submitting a media rating 236, media review 239, and/or media check-in 240 associated with a suggested media item 270. In addition, the consumption factors may include determining that a suggested media item 270 is within the same genre category as one of the media items 227 in the consumption history 265. The consumption factors may also include determining that a plurality of users that have consumed the suggested media item 270 have also consumed at least one other media item 227 in the consumption history 265 of a user.

In some embodiments, each of the consumption factors may be pre-determined and associated with a constant weighting value. In one embodiment, the confidence score 268 may be calculated, for example, as follows:

$$z_n = (c_1 + c_2 + \ldots + c_n) + \epsilon$$

where $z_n$ is the confidence score 268 for a particular suggested media item 270, $c_n$ are positive weighting values for each of the consumption factors whose sum is one, and $\epsilon$ is a variable representing noise. The $c_n$, or positive weighting values may correspond to one or more consumption factors, consumption patterns, or other factors, used to identify the suggested media item 270. Suppose that the consumption solicitor 221 determines a consumption pattern based on a threshold count of media items 270 being identified in the consumption history 265 as being part of the same genre. The similar genre consumption pattern may, for example, correspond to a first weighting value. To calculate the confidence level 806 (FIG. 8) to be displayed on a user interface 280, such as the user interface 280 shown in FIG. 8, the confidence score 268 may be multiplied by a constant value to obtain a percentage indicating the confidence level 806.

In addition, continuing with the example in which the consumption solicitor 221 identified season one of the television series as the suggested media item 270, the consumption pattern associated with other seasons being identified in the consumption history may correspond to a second weighting value. If the consumption solicitor 221 also identifies season one as a suggested media item 270 based on a consumption pattern, such as a genre similarity, then season one of the television series would also be associated with the second weighting value. In such a case, the confidence score 268 (FIG. 2) associated with season one of the television series may be a sum of the first weighting value and the second weighting value multiplied by a constant value.

Once the confidence score 268 for the suggested media item 270 has been determined, the consumption solicitor 221 may determine whether the confidence score 268 for the suggested media item 270 meets a pre-defined threshold in box 1015. Suppose that the consumption solicitor identifies the pre-defined threshold to be a value of 0.95. The consumption solicitor 221 may then compare the confidence score 268 to the pre-defined threshold. If the confidence score 268 is above the pre-defined threshold, the consumption solicitor 221 may record consumption of suggested media item 270 in the consumption history 265, in box 1018. If the confidence score 268 is on or below the threshold, the consumption solicitor 221 may solicit consumption of the suggested media item 270 in box 1021. For example, the consumption solicitor 221 may solicit consumption by encoding for display at least a portion of the user interface 280, such as, for example the solicitation interface 112. As another illustrative example, the consumption solicitor 221 may also solicit consumption of the suggested media item 270 by encoding for display a user interface 280 comprising the listing 803 and corresponding add component 809 shown in FIG. 8.

In box 1024, the consumption solicitor 221 determines if the user indicates a previous consumption of the media item 227. For example, the consumption solicitor 221 may receive a selection via the user interface 280 indicating that the user has previously consumed the suggested media item 270. In box 1018, the consumption solicitor 221 determined that the user indicated a previous consumption of the suggested media item 270 and records the consumption of the suggested media item 270 in the consumption history 265. Thereafter, the portion of the consumption solicitor 221 ends.

Figure 11:
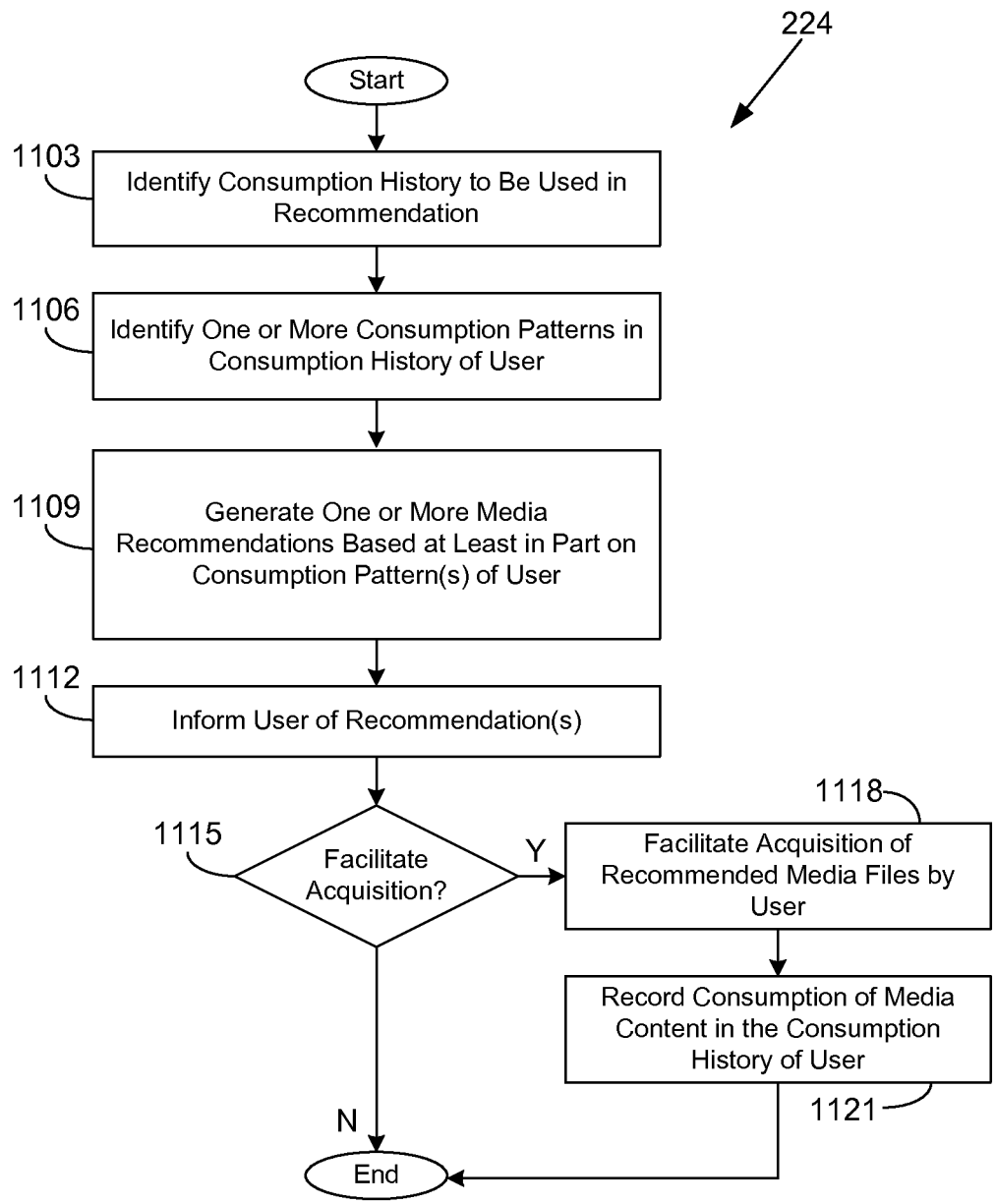
FIG. 11 is a flowchart illustrating one example of functionality implemented as portions of the recommendations engine executed in a computing environment in the networked environment of FIG. 2 according to various embodiments of the present disclosure.

Referring next to FIG. 11, shown is a flowchart that provides one example of the operation of a portion of the recommendations engine 224 according to various embodiments. It is understood that the flowchart of FIG. 11 provides merely an example of the many different types of functional arrangements that may be employed to implement the operation of the portion of the recommendations engine 224 as described herein. As an alternative, the flowchart of FIG. 11 may be viewed as depicting an example of elements of a method implemented in the computing environment 203 (FIG. 2) according to one or more embodiments.

Beginning in box 1103, the recommendations engine 224 identifies the consumption history 265 (FIG. 2) of the user to be used in generating a recommendation. After which, in box 1106, the recommendations engine 224 identifies one or more consumption patterns in the consumption history 265, in a manner similar to that described above with reference to box 1006 in FIG. 10. Once the consumption pattern is identified, the recommendations engine 224, in box 1109, generates one or more media recommendations based at least in part on the consumption pattern. In one embodiment, the media recommendations may exclude media items 227 (FIG. 2) present in the consumption history 265.

Alternatively, in a situation in which the user has identified user preferences indicating that the user is interested in consuming certain types of media items 227 repeatedly and/or frequently, the media recommendations may include those media items 227 present in the consumption history 265. For example, it may be the case that a user watches a certain sitcom every night before going to bed. In such a case, the recommendations engine 224 may recommend an episode of the sitcom for the user to watch at similar times each night. Specifically, the recommendations engine 224 may recommend an episode of the sitcom that the user has not seen a while.

In box 1112, the recommendations engine 224 informs the user of the media recommendations. In box 1115, the recommendations engine 224 may determine whether the user has selected to facilitate acquisition of the media item 227 recommended. In such a case, in box 1118, the recommendations engine 224 may facilitate acquisition of the recommended media item 227 for the user, for example, via the electronic commerce system 215 (FIG. 2). In one embodiment, the recommendations engine 224 may also interface with third-party environments to facilitate acquisition of the recommended media item 227 via the third-party environments. Once the user has begun consuming the recommended media item 227, the recommendations engine 224 may record consumption of the recommended media item in the consumption history of the user in box 1121. Thereafter, the portion of the recommendations engine 224 ends.

Figure 12:
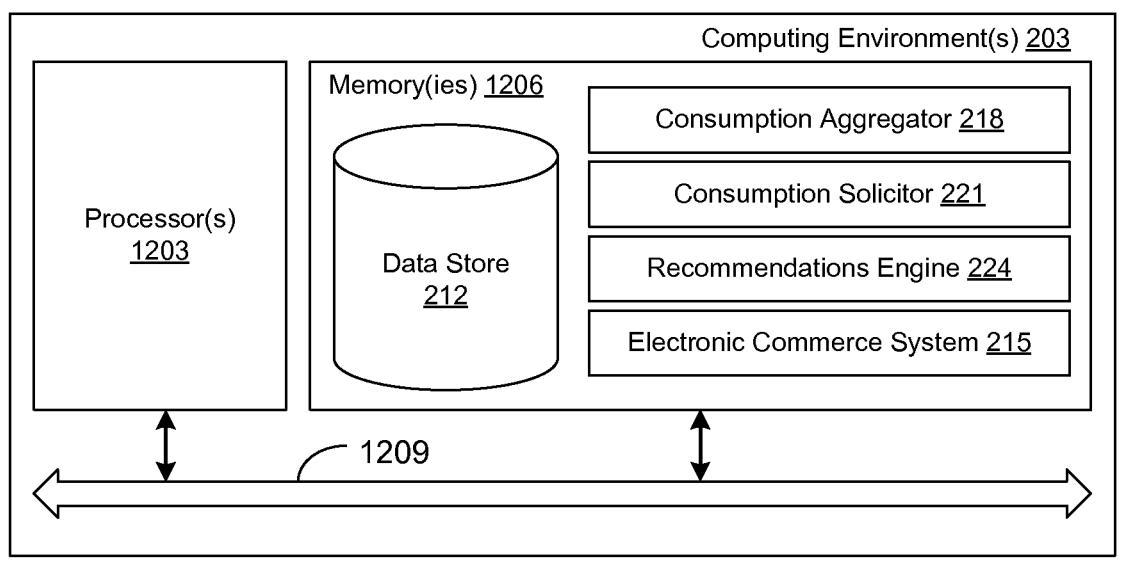
FIG. 12 is a schematic block diagram that provides one example illustration of a computing environment employed in the networked environment of FIG. 2 according to various embodiments of the present disclosure.

With reference to FIG. 12, shown is a schematic block diagram of the computing environment 203 according to an embodiment of the present disclosure. The computing environment 203 includes at least one processor circuit, for example, having a processor 1203 and a memory 1206, both of which are coupled to a local interface 1209. To this end, each computing environment 203 and/or client 206 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the electronic commerce system 215, consumption aggregator 218, consumption solicitor 221, recommendations engine 224, and potentially other applications. Also stored in the memory 1206 may be a data store 212 and other data. In addition, an operating system may be stored in the memory 1206 and executable by the processor 1203.

It is understood that there may be other applications that are stored in the memory 1206 and are executable by the processor 1203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and/or multiple processor cores and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the electronic commerce system 215, consumption aggregator 218, consumption solicitor 221, recommendations engine 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 9-11 show the functionality and operation of an implementation of portions of the consumption aggregator 218, consumption solicitor 221, and recommendations engine 224, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flowcharts of FIGS. 9-11 show a specific order of execution, it is understood that the order of execution may differ from that which is depicted. For example, the order of execution of two or more blocks may be scrambled relative to the order shown. Also, two or more blocks shown in succession in FIGS. 9-11 may be executed concurrently or with partial concurrence. Further, in some embodiments, one or more of the blocks shown in FIGS. 9-11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215, consumption aggregator 218, consumption solicitor 221, recommendations engine 224, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 215, consumption aggregator 218, consumption solicitor 221, recommendations engine 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed, the program causes the at least one computing device to at least:

store consumption history associated with a user account in a computer data store, the user account associated with a user, the consumption history including a consumption of a plurality of media items by the user from at least one computer data store;

generate data that encodes one or more first network site user interfaces associated with a network site;

transmit the data that encodes the one or more first network site user interfaces to a client device associated with the user;

receive user interaction data associated with the one or more first network site user interfaces rendered on the client device, the interaction data comprising a plurality of consumption indication events involving data exchange between the client device and the network site over a network;

determine that the user has performed at least one of a plurality of consumption indication events for a first media item based at least in part on the user interaction data, the at least one of the plurality of consumption indication events comprising at least one of: submitting a review via a first network site user interface of the one or more first network site user interfaces comprising a textual description expressing a negative preference regarding the first media item, submitting a media check-in by selecting a check-in component indicating a present consumption of the first media item via the first network site user interface, or indicating a past consumption of the first media item by selecting a component to mark the first media item as previously consumed via the first network site user interface, the first media item comprising a consumable video;

record consumption of the first media item in the consumption history in the computer data store;

determine, by analyzing data from the consumption history retrieved from the computer data store, a pattern of media consumption in the consumption history;

identify a second media item based at least in part on the pattern of media consumption;

retrieve a list of the plurality of media items associated with the user from the consumption history in the computer data store; and encode for display a second network site user interface on the client device of the user, the second network site user interface presenting the plurality of media items and the second media item.

2. The non-transitory computer-readable medium of claim 1, further causes the at least one computing device to at least determine a confidence score for the second media item, the confidence score indicating a likelihood that the user has already consumed the second media item, wherein the confidence score is determined by computing a weighted sum of scores for a plurality of consumption factors.

3. The non-transitory computer-readable medium of claim 2, wherein the plurality of consumption factors comprise at least one of determining that the second media item is within a same category as the first media item and determining that a plurality of consumers of the second media item is the same as a plurality of viewers of the first media item.

4. The non-transitory computer-readable medium of claim 1, wherein when executed the program further causes the at least one computing device to at least:

determine that the review comprising the textual description expressing the negative preference regarding the media item comprises a textual reference to the second media item; and determine a confidence score indicating a likelihood of consumption of the second media item based at least in part on the textual reference.

5. A system, comprising:

a computer data store that stores a consumption history associated with a user account of a user, the consumption history including a consumption of a plurality of media items by the user from at least one computer data store;

at least one computing device; and a consumption aggregator executed in the at least one computing device, wherein, when executed, the consumption aggregator causes the at least one computing device to at least:

generate data that encodes one or more first network site user interfaces associated with a network site;

transmit the data that encodes the one or more first network site user interfaces to a client device associated with the user;

receive user interaction data associated with the one or more first network site user interfaces rendered on the client device, the interaction data comprising a record of user interaction with the one or more first network site user interfaces involving data exchange between the client device and the network site over a network;

determine that the user has consumed a media item in response to determining that the user has implicitly indicated consumption of the media item based at least in part on the user interaction data, the record of user action comprising at least one of: submitting a review via a first network site user interface of the one or more first network site user interfaces comprising a textual description expressing a negative preference regarding the media item, submitting a media check-in by selecting a check-in component indicating a present consumption of the media item via the first network site user interface, or indicating a past consumption of the media item by selecting a component to mark the media item as previously consumed via the first network site user interface, the media item comprising a consumable video;

record a consumption event describing the consumption of the media item in the consumption history in the computer data store;

retrieve a list of the plurality of media items from the consumption history in the computer data store; and generate data that encodes a second network site user interface for rendering on the client device of the user, the second network site user interface presenting the list of the plurality of media items and a second media item.

6. The system of claim 5, wherein the consumption aggregator further causes the at least one computing device to at least determine that the user has implicitly indicated the consumption of the media item when the user has not explicitly indicated the consumption of the media item.

7. The system of claim 5, wherein indicating a past consumption of the media item further comprises receiving explicit indication from the user indicating that the user has previously consumed the media item.

8. The system of claim 5, wherein the consumption aggregator further causes the at least one computing device to at least generate a recommendation for the user in response to identifying at least one consumption pattern in the consumption history.

9. The system of claim 5, wherein the consumption aggregator further causes the at least one computing device to at least:

determine that the review comprising the textual description expressing the negative preference regarding the media item comprises a textual reference to a second media item; and determine a confidence score indicating a likelihood of consumption of the second media item based at least in part on the textual reference.

10. The system of claim 5, wherein the consumption aggregator further causes the at least one computing device to at least:

determine the second media item based at least in part on a consumption pattern identified in the consumption history;

determine a confidence score associated with the second media item; and record consumption of the second media item in the consumption history in response to determining that the confidence score meets a threshold confidence level.

11. The system of claim 5, wherein the consumption aggregator further causes the at least one computing device to at least:

determine the second media item based at least in part on a consumption pattern identified in the consumption history;

determine a confidence score associated with the second media item; and generate data that encodes the second network site user interface for rendering on a client device of the user in response to determining that the confidence score fails to meet a threshold confidence level, the second network site user interface comprising a component requesting the user to confirm whether the user has consumed the second media item.

12. The system of claim 11, wherein the consumption aggregator further causes the at least one computing device to at least receive a selection from the user via the component of the second network site user interface, the selection indicating that the user has consumed the second media item.

13. A method, comprising:

generating, by at least one computing device, data that encodes one or more first network site user interfaces associated with a network site;

transmitting, by the at least one computing device, the data that encodes one or more network user interfaces to a client device associated with the user;

receiving, by the at least one computing device, user interaction data associated with the one or more network user interfaces rendered by the client device, the interaction data comprising at least one user action with the one or more first network user interfaces involving data exchange between the client device and the network site over a network;

determining, by the at least one computing device, that a user has performed the at least one user action based at least in part on the user interaction data, the at least one user action comprising at least one of a plurality of consumption indication events for a media item, the user associated with a user account, the consumption indication events comprising at least one of: submitting a review of the media item via a first network site user interface comprising a textual description expressing a negative preference regarding the media item, submitting a media check-in by selecting a check-in component indicating a present consumption of the media item via the first network site user interface, or indicating a past consumption of the media item by selecting a component to mark the media item as previously consumed via the first network site user interface, the media item comprising a consumable video;

determining, by the at least one computing device that the user has consumed the media item in response to determining, based at least in part on the at least one user action on the network site, that the user has performed the at least one of the consumption indication events for the media item;

recording, by the at least one computing device, consumption of the media item in a consumption history of the user in a computer data store, the consumption history including a consumption of a plurality of media items by the user from at least one computer data store;

retrieving, by the at least one computing device, a list of the plurality of media items from the consumption history of the user in the computer data store; and encoding for display, by the at least one computing device, a second network site user interface on a client device of the user, the second network site user interface presenting the plurality of media items and a second media item.

14. The method of claim 13, further comprising:

identifying, by the at least one computing device, a pattern in the consumption history;

identifying, by the at least one computing device, the second media item based at least in part on the pattern in the consumption history; and determining, by the at least one computing device, a confidence level indicating a likelihood that the user has consumed the second media item.

15. The method of claim 14, wherein the user interface further presents the second media item.

16. The method of claim 14, wherein the user interface further presents the second media item and the confidence level of the second media item.

17. The method of claim 13, further comprising ranking, by the at least one computing device, the plurality of media items in the consumption history.

18. The method of claim 13, generating, by the at least one computing device, a media recommendation based at least in part on a consumption pattern identified in the consumption history.

19. The method of claim 13, further comprising obtaining, by the at least one computing device, consumption data from a social media account associated with the user.

20. The method of claim 13, further comprising obtaining, by the at least one computing device, consumption data from a streaming media account associated with the user.

\* \* \* \* \*